United States Patent [19]

Blake et al.

[11] Patent Number: 4,880,531
[45] Date of Patent: Nov. 14, 1989

[54] POOL VACUUM FILTER BAG

[75] Inventors: Scott L. Blake, Anaheim; Millie A. Carthew, Westminster; Christopher G. Collins, Garden Grove, all of Calif.

[73] Assignee: Christopher G. Collins, Garden Grove, Calif.

[21] Appl. No.: 163,329

[22] Filed: Mar. 2, 1988

[51] Int. Cl.⁴ .................................. B01D 35/16
[52] U.S. Cl. .................. 210/169; 210/238; 210/416.2; 15/1.7; 55/DIG. 2
[58] Field of Search ............... 210/169, 237, 238, 232, 210/357, 413, 416.2; 55/365, 368, 370, 371, 376, 381, 366, 433, DIG. 2; 134/167 R; 15/1.7

[56] References Cited

U.S. PATENT DOCUMENTS

| 1,383,615 | 7/1921 | Geier | 55/370 |
| 1,827,496 | 10/1931 | Vanderwilt | 55/370 |
| 1,970,043 | 8/1934 | Kern | 55/368 |
| 2,024,143 | 12/1935 | Cameron | 55/368 |
| 2,039,741 | 5/1936 | Richards | 55/366 |
| 2,171,909 | 9/1939 | Berman | 55/370 |
| 2,174,730 | 10/1939 | White | 55/370 |
| 4,448,686 | 5/1984 | Friedman | 210/238 |
| 4,575,423 | 3/1986 | Alanis et al. | 210/169 |
| 4,618,420 | 10/1986 | Alanis | 210/169 |
| 4,670,030 | 6/1987 | Schultz | 55/370 |

FOREIGN PATENT DOCUMENTS 52-13170 2/1977 Japan ..................... 55/370

Primary Examiner—Peter Hruskoci
Assistant Examiner—Coreen Y. Lee
Attorney, Agent, or Firm—Roy A. Ekstrand

[57] ABSTRACT

A pool vacuum filter bag for use in combination with a submersible pool vacuum unit is formed of a pair of mesh layers joined by a plurality of sewn seams to form an integral closed filter bag having a elongated flow chamber and an elongated closed end debris chamber. An upper chamber joins the debris chamber and the flow chamber and a mouth portion is adapted to receive and secure attachment to the discharge port of a pool vacuum unit. The upper seam of the filter bag is formed by a joined pair of hook and pile Velcro-type fastening strips and means are provided for securing the filter bag in an upright position parallel to the pool vacuum unit water supply hose. The filter bag includes a curved flow directing portion which reduces accumulation of debris within the flow chamber and enhances debris collection performance. The filter bag may be turned inside-out for cleaning while still attached to the discharge port of the pool vacuum unit.

17 Claims, 3 Drawing Sheets

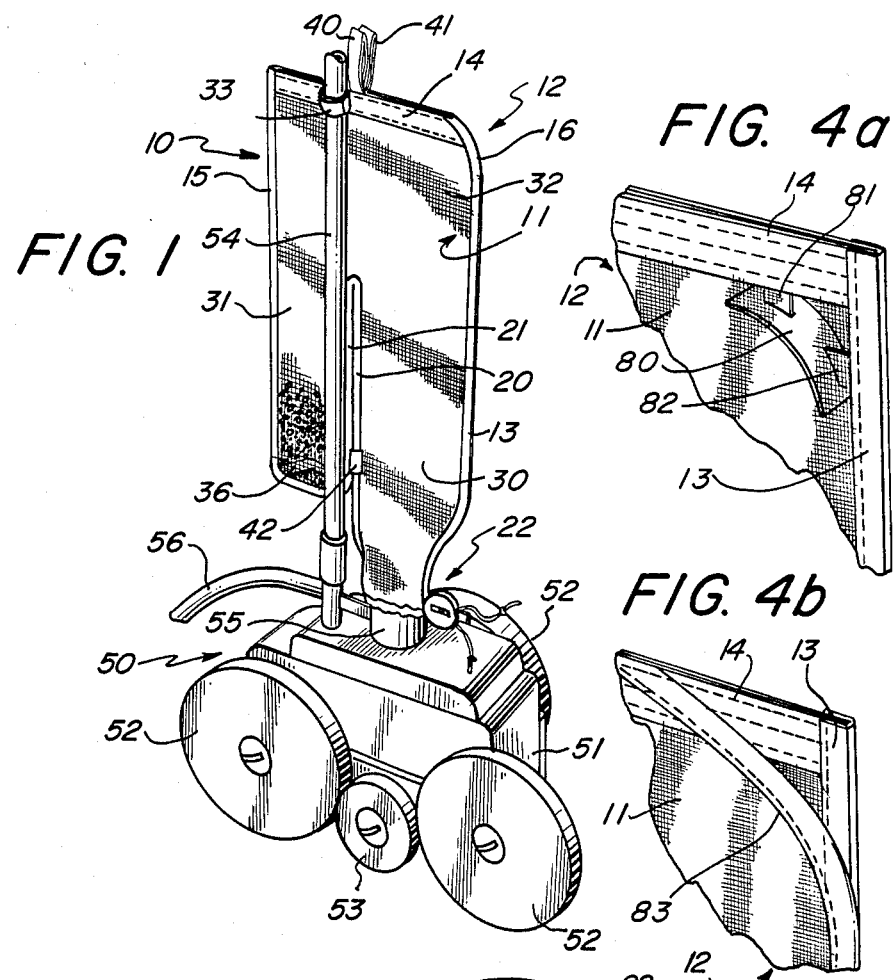
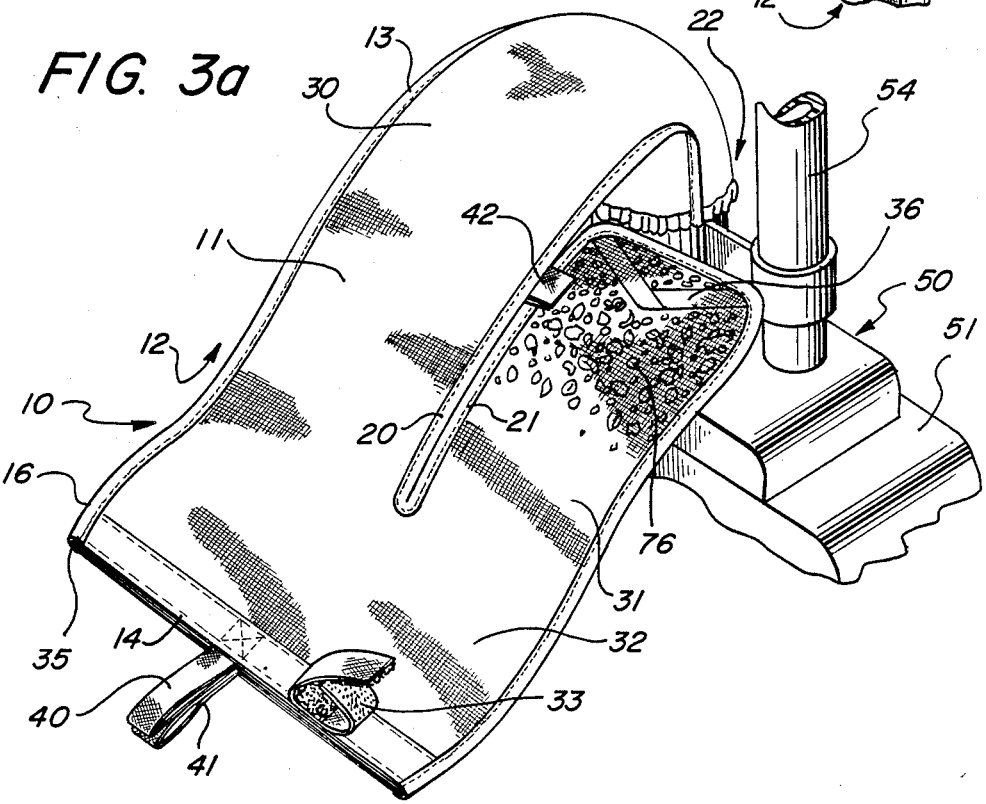

POOL VACUUM FILTER BAG

FIELD OF THE INVENTION

This invention relates generally to swimming pool cleaning apparatus and particularly to submersible pool vacuuming units.

BACKGROUND OF THE INVENTION

In the typical swimming pool or spa environment to which the invention pertains, a filtering system within the swimming pool circulates the pool water through a filter and returns it to the pool. In the typical environment, a substantial amount of dirt and sediment as well foreign materials, such as leaves and insects, tend to collect upon the bottom and side surfaces of the pool. In most instances, the filtering system of the pool does not adequately dislodge and remove the submerged collected particles. To meet the cleaning problems associated with such submerged sediment and debris, the pool may be periodically vacuumed using a hand manipulated vacuum unit coupled to the filtering system of the pool or, in the alternative, a submersible pool or spa vacuum unit of the type to which the invention pertains may be employed.

Such submersible pool vacuuming units vary considerably in structure but generally all comprise a submersible housing which supports a plurality of drive wheels and an internal hydraulic drive unit. A water supply hose extends from the drive unit and provides a coupling to a source of water under pressure such as the discharge port of the above-mentioned pool filtering system. In many instances, an additional unit known as a "rear whip" is employed to stir and dislodge sediment from the pool bottom and side surfaces. A filter bag, typically formed of a mesh-like material readily porous to water flow, is coupled to the housing and receives a flow of water. In normal operation, the water flow is applied to the drive unit and to a vacuuming chamber within the housing such that the pool vacuum is caused to move about the pool bottom and side surfaces while the water flow creates a vacuuming action upon the submerged pool surface in which sediment and debris are carried into the filter bag. Because the bag is porous to the water flow, the water flow is discharged through the fabric of the filter bag returning to the pool environment while the dirt and sediment is trapped within the filter bag.

Examples of such pool vacuuming units are found in U.S. Pat. No. 3,972,339 issued to Henkin, et al. which sets forth an AUTOMATIC SWIMMING POOL CLEANER which comprises a car adapted to travel underwater along a random path on a pool vessel surface for dislodging debris therefrom. The car wheels are driven by a water powered turbine to move the car. Means within the car provide the above-described water flow creating the vacuuming action within the car. The water flow carrying the debris is directed upwardly through a discharge nozzle to a generally balloon-like filter bag formed of a mesh material.

Another example of such pool vacuuming units is found in U.S. Pat. No. 3,822,754 issued to Henkin, et al. which sets forth an AUTOMATIC SWIMMING POOL CLEANER having a structure virtually identical to that set forth in U.S. Pat. No. 3,972,339. U.S. Pat. No. 3,822,754 shows a similar balloon-like filter bag receiving the discharge flow of the pool cleaning unit.

In the most filter bags employed in the above-described pool vacuuming units, the filter bag is formed of a mesh-like material having a generally flexible character which is formed into a closed unit having an inlet opening and means for securing the inlet opening to the discharge port of the pool vacuum unit. While the above-described pool cleaning system functions satisfactorily, several difficulties arise in the accumulation of debris within the filter bag. Typically such debris has been found to accumulate in places within the filter bag which tend to clog or interfere with the operation of the pool vacuum unit. In addition, the cleaning of such filter bags is often a cumbersome and difficult task. These problems have promted practitioners in the art to develop various filter bags intended to better control the water flow and accumulation of debris within the filter bag. An example of such recently developed filter bags is set forth in U.S. Pat. No. 4,618,420 issued to Alanis which sets forth a FILTER BAG FOR POOL CLEANERS which is formed from an elongated stretch of porous fabric such as nylon mesh folded upon itself to define conforming left and right side walls which are joined by front and rear seams. The filter bag set forth defines a seamless upper end. A mounting collar secures the bottom end of the filter bag to the discharge port of the pool vacuum unit. An upstanding divider seam is provided which divides the filter bag into a flow chamber coupled to the discharge port and a collection chamber adjacent to but separated from the discharge port. The intent in U.S. Pat. No. 4,618,420 is to provide a relatively intense flow upwardly through the flow chamber and the collection of debris within the collection chamber as a result of flow direction within the bag. A Velcro-type fastener strip is attached to a separable seam within the debris collection chamber to provide for cleaning of the bag.

A filter bag substantially similar to that set forth in U.S. Pat. No. 4,618,420 is also set forth in Design Pat. No. 288,373 issued to Alanis and entitled a FILTER BAG.

Other U.S. Patents such as U.S. Pat. Nos. 3,932,281, 3,063,077, and Design Pat. No. 260,094 set forth additional uses of mesh type filter bags.

While the foregoing described prior art filter bags have enjoyed some commercial success and have produced some improvement in the performance of such pool vacuuming units, they remain subject to some extent to the above-described problems associated with the accumulation of debris in undesired portions of the filter bag and difficulties associated with cleaning the filter bag and removing accumulated debris therefrom.

There remains, therefore, a need in the art for an efficient easy to use pool vacuum filter bag which avoids accumulation of debris in undesired places and which provides for the easy removal of debris and cleaning of the filter bag.

SUMMARY OF THE INVENTION

Accordingly, it is a general object of the present invention to provide an improved pool vacuum filter bag. It is a more particular object of the present invention to provide an improved pool filter bag which provides an improved water flow and improved debris collection. It is a still more particular object of the present invention to provide an improved pool vacuum filter bag which may be readily cleaned and from which accumulated debris may be removed conveniently and without the need for removing the filter bag from the pool vacuum unit.

In accordance with the invention, there is provided a filter bag for use in combination with a pool vacuum unit formed of two similarly shaped layers of mesh material arranged to overly each other. The mesh layers are joined to form a mouth portion adapted to be received upon the discharge port of a pool vacuum and a flow chamber extending upwardly therefrom. The flow chamber terminates in an upper chamber which extends generally perpendicular to the flow chamber and a debris collection chamber extends generally cownwardly from the upper chamber. The upper edge of the upper chamber is joined by a strip of Velcro-type fasteners which provides for opening of the upper chamber of the filter bag. The debris collection chamber is separate from the flow chamber and Velcro-type fastening strips are secured to a portion of the flow chamber and the debris collection chamber to provide removable fastening therebetween. The flow chamber is configured to direct the water flow therein into a curved flow to better accumulate debris within the collection chamber and avoid the accumulation of debris at the upper edge of the upper chamber. Without a curved flow of water, debris would collect in the upper chamber and eventually block the flow chamber unless the bag has a seamless top. Thus, a curved flow allows a Velcro opening at the top of the bag and collection of debris in the debris chamber while keeping the flow chamber clear.

BRIEF DESCRIPTION OF THE DRAWINGS

The features of the present invention, which are believed to be novel, are set forth with particularity in the appended claims. The invention, together with further objects and advantages thereof, may best be uderstood by reference to the following description taken in conjunction with the accompanying drawings, in several figures of which like referencee numerals identify like elements and in which:

FIG. 1 is a perspective view of the present invention pool vacuum filter bag assembled to a typical pool vacuum unit;

FIGS. 3a, 3b, and 3c set forth the sequential positions of the present invention pool vacuum filter bag during the cleaning operation; and FIGS. 4a and 4b set forth alternate embodiments of the flow directing portion of the present invention.

DESCRIPTION OF THE PREFERRED EMBODIMENTS

Figure 2:
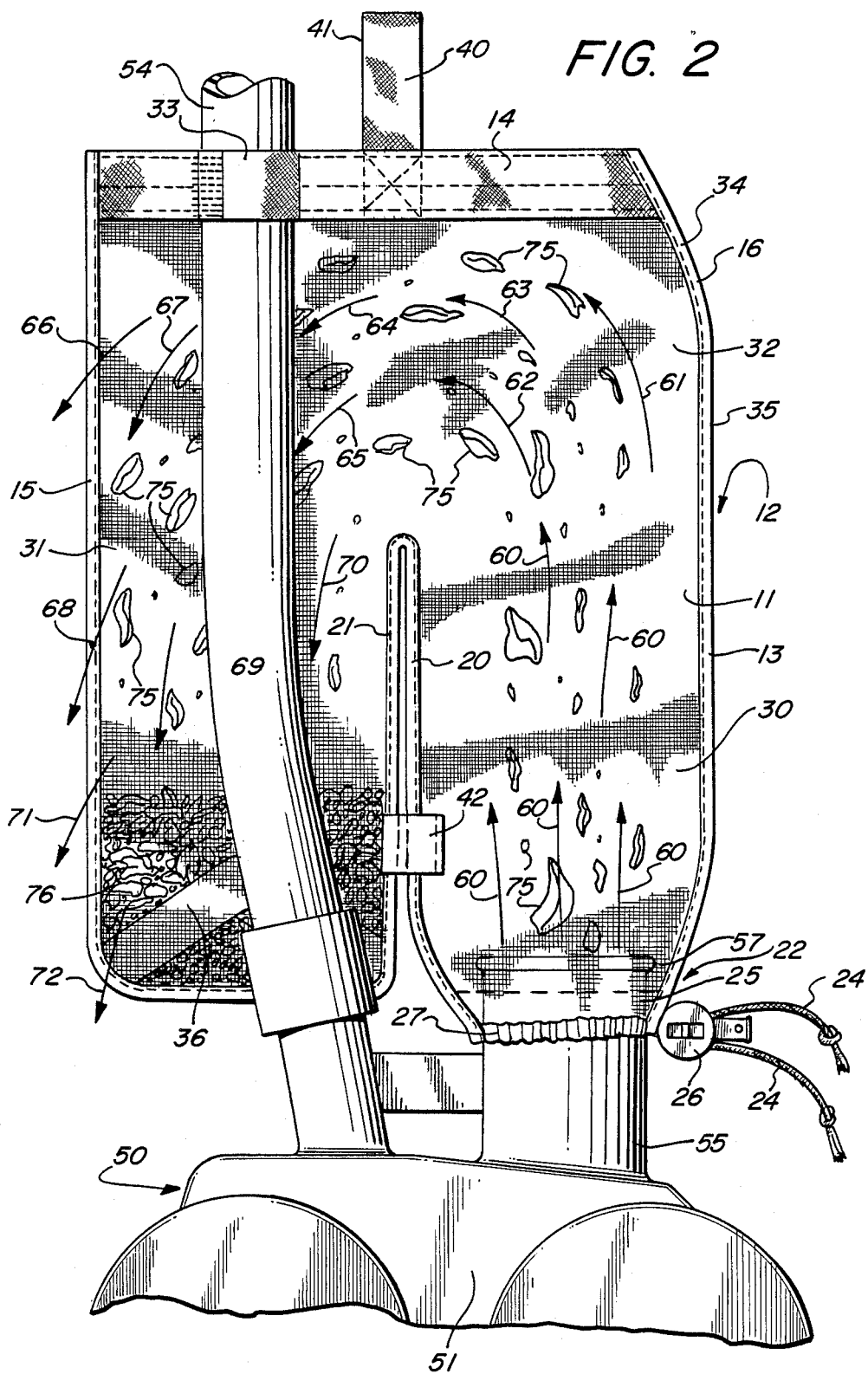
FIG. 2 is an elevation view of the present invention pool filter bag.

FIG. 1 sets forth a perspective view of the present invention pool vacuum filter bag generally referenced by numeral 10 assembled to a typical pool vacuum unit generally referenced by numeral 50. The position shown for filter bag 10 is the normal operating position of the filter bag. Filter bag 10 includes a pair of overlying mesh layers 11 and 12 preferably formed of a relatively fine mesh material, such as nylon or the like, having a density selected to readily pass water flow through the walls of the mesh bag but sufficiently fine to trap the majority of debris elements vacuumed up by the pool vacuum unit. Mesh layers 11 and 12 are substantially identical in shape. A front seam 13 joins mesh layers 11 and 12 along the front edge of filter bag 10 and is formed by the sewing or stitching of mesh layers 11 and 12. In addition, front seam 13 in its preferred form includes an overlapping or folded over binding material for added strengh. A seam 20 joins mesh layers 11 and 12 in a similar fashion to front seam 13 forming an elongated flow chamber 30 between front seam 13 and seam 20. In addition, a mouth opening 22 is formed at the lower end of mesh layers 11 and 12 and seams 20 and 13. Mouth 22 further accommodates a mouth closure 22, the function of which is described below in greater detail. A rear seam 15 joins the rear edges of mesh layers 11 and 12 and a seam 21 extends from the upper end of seam 20 and joins seam 15 to form therebetween a debris chamber 31. In addition, seam 21 secures a ribbon-like loop 36 secured between mesh layers 11 and 12. Seams 21 and 15 form therebetween a debris chamber 31 having a closed bottom end and an open upper end. A top seam 14 comprises a pair of Velcro-type fastening strips extending from the upper portion of front seam 13 to the upper portion of ream seam 15 and completes closure of filter bag 10 along its upper edge. A pair of ribbon-like loops 40 and 41 are secured to mesh layers 11 and 12 respectively and to Velcro-type fastener strips comprising top seam 14. A supply hose attachment 33 preferably formed of a Velcro-type fastener is secured to mesh layer 11 and top seam 14. A chamber attachment 42 is preferably formed of a pair of Velcro-type attachment strips having one member secured to seam 20 and the other member secured to seam 21. In accordance with an important aspect of the present invention, front seam 13 defines a curved portion 16 at the point proximate to top seam 14.

While seams 13, 15, 20 and 21 are described as separate seams, in their preferred form they are combined into a continuous single seam. In addition, while the preferred attachment for the seams of filter bag 10 is sewing, other methods such as adhesive, etc. may be used.

Pool vacuuming unit 50 is representative of a conventional submersible pool or spa vacuuming unit and comprises a housing 51 supporting a plurality of wheels 52 and a drive unit 53 coupled to wheels 52. Housing 51 supports an upwardly extending discharge port 55 having a generally cylindrical construction and a dislodging hose 56 forming a tail whip to shake up debris and sediment extending outwardly from housing 51. An upwardly extending tubular water supply hose 54 is coupled to housing 51 at one end and to a supply of pressurized water flow (not shown). Mouth 22 of filter bag 10 is received upon discharge port 55 and tightly closed thereon by mouth closure 22. In addition, supply hose attachment 33 encircles a portion of water supply hose 54 to attach top seam 14 of filter bag 10 to water supply hose 54 and maintain filter bag 10 in a generally upright or vertical position.

Thus, as seen in FIG. 1, filter bag 10 is supported above pool vacuum 50 and is coupled to discharge port 55 of pool vacuum 50 and secured to water supply hose 54. As described below in greater detail, filter bag 10 is carried above pool vacuum 50 as pool vacuum 50 travels about the bottom and side surfaces of the swimming pool environment. As is also set forth below in greater details, the flow of water wpwardly through discharge port 55 is directed upwardly through flow chamber 30 while bearing bits and pieces of vacuumed debris. As the upwardly directed water flow reaches upper chamber 32, a lateral component to the flow is created by curved portion 16 causing the flow to move laterally across upper chamber 13 and begin dispersing outwardly through mesh layers 11 and 12. As the flow of water continues to disperse outwardly through mesh layers 11 and 12 and travel laterally through upper chamber 32, the bits and pieces of debris carried by the water flow begin to drop downwardly and are received within debris chamber 31. These accumulated bits of debris are collected at the lower portion of debris chamber 31.

FIG. 2 sets forth a side view of filter bag 10 secured to pool vacuum 50 in the operational position of FIG. 1. For purposes of clarity in FIG. 2, mesh layers 11 and 12 are shown generally transparent with some shades areas to indicate the mesh-like construction of mesh layers 11 and 12. However, to better facilitate the descriptions of the operational characteristics of filter bag 10 set forth in FIGS. 1 through 3, mesh layers 11 and 12 are depicted as "see through" layers to avoid the necessity of indicating internal features of the operation and structure of filter bag 10 in dashed line representation.

Thus, in FIG. 2 filter bag 10 comprises overlying mesh layers 11 and 12 which as mentioned above are preferably formed of a tightly woven nylon mesh material or the like. A front seam 13 and a seam 20 join mesh layers 11 and 12 to form an upwardly extending flow chamber 30. A mouth portion 22 terminates the lower end of flow chamber 30 and includes a folded layer 25 which is stitched to form a gathered portion 27. A cord 24 is passed through gathered portion 27 and is received by a slide lock 26. In its preferred form, slide lock 26 comprises the unit manufactured under the commercial name "B-Loc 2". The combination of slide lock 26, cord 24, gathered portion 27, and fold 25 forms mouth closure 23 in which cord 24 is tightly drawn gathering mouth 22 into a gathered portion 27 which encircles discharge port 55 of pool vacuum 50 below lip 57. With cord 24 tightly drawn, slide lock 26 secures mouth 22 discharge port 55 and retains it beneath lip 57. Seams 21 and rear seam 15 combine to secure mesh layers 11 and 12 together and form therebetween a debris chamber 31. An upwardly extending loop 37 is secured within debris chamber 31 by seams 21 and 15. A top seam 14 is formed of a pair of inwardly facing Velcro-type fastener strips (better seen in FIG. 3a) which provide closure of mesh layers 11 and 12 along top seam 14 and form upper chamber 32. Top seam 14, in its preferred form, is secured by a plurality of sewn stitches 34 which in turn secure loops 40 and 41 to each of the Velcro-type fasteners forming top seam 14 as is better shown in FIG. 3a. It will be apparent that other attachments such as adhesive may be used to secure top seam 14. Supply hose attachment 33, which as described above comprises a Velcro-type strip attachment, is secured to mesh layer 11 by stitches 34 and encircles water supply hose 54 of pool vacuum 50. A chamber stabilizer attachment 42 comprises a Velcro-type fastener strip pair having one portion secured to seam 20 of flow chamber 30 while the other comprises a V-shaped member secured to seam 21 of debris chamber 31. The use of a V-shaped member in chamber stabilizer attachment 42 prevents debris chamber 31 from waving erratically during use which in turn improves debris collection.

It should be noted that in the preferred form front seam 13, seams 20 and 21, as well as rear seam 15 are strengthened by a folded over ribbon of seam binder 34 which is stitched to mesh layers 11 and 12 by a plurality of sewn stitching 34. It should also be noted that front seam 13 and curved portion 16 extend in the preferred form continuously from mouth 22 to top seam 14. Similarly, in its preferred form, seams 20, 21 and rear seam 15 extend continuously from mouth 22 up between flow chamber 30 and debris chamber 31 and then upwardly to join top seam 14. As mentioned, however, while in the preferred form the foregoing seams are continuous, they may be also be separate and for purposes of discussion they will be referred to by the separate reference numerals given.

In operation, with filter bag 10 assembled as shown in FIGS. 1 and 2, an upwardly directed stream of water flows in the directions indicated by arrows 60 and immerges from discharge port 55 within flow chamber 30 of bag 10. In accordance with conventional pool vacuum operation, the upwardly erected flow of water carries with it various elements of debris indicated by reference numeral 70 which should be undestood to be moving in the directions indicated by arrows 60 upwardly through flow chamber 30. The flow of water and debris portions 75 continue upwardly through flow chamber 30 as indicated by arrows 60. As the water flow enters upper chamber 32, the presence of curved portion 16 and top seam 14 combine to direct the water flow and debris particles 75 in a curving path indicated by arrows 61, 62 and 63. As the water flow approaches the midpoint of upper chamber 32, it is travelling generally horizontally and debris particles 75 under the effect of gravity begin to settle downwardly as they are carried laterally by the water flow. In addition, because mesh layers 11 and 12 permit the outward passage of water and because this outward portion of water flow reduces the intensity and speed of the flowing water within upper chamber 32, debris particles 75 begin to settle downwardly as they are carried laterally through upper chamber 32. Thereafter the water flow continues in the directions indicated by arrows 64, 65, 66 and 67 into the upper portion of debris chamber 31 with a continued outward flow through mesh layers 11 and 12. Thereafter, the remaining residual of water flow is directed downwardly into debris chamber 31 by the combination of top seam 14 and rear seam 15. As water continues to flow outwardly through mesh layers 11 and 12 and a residual amount of water flow indicated by arrows 68 through 72 continues, debris components 75 settle downwardly into the lower portion of debris chamber 31 and form an accumulation of debris 76.

It should be noted that in accordance with an important aspect of the present invention, the operation of curved portion 16 in combination with top seam 14 causes the water flow to move in a curved path and thereafter laterally across upper chamber 32. This curved flow pattern and lateral flow pattern combine to maintain the area proximate to curved portion 16 and the front portion of top seam 14 substantially clear of accumulated debris and thus avoid the tendency particularly with the use of Velcro-type strips at top seam 14 of debris to collect in the upper front corner and long the upper front seam of the filter bag. This avoidance of debris collection in the upper front corner portions of the filter bag is particularly advantageous in that such accumulation normally falls downwardly through the flow chamber when the unit is turned off to permit cleaning of the bag. Such downwardly falling debris particles often pass out into the pool environment through the vacuuming passages of the pool vacuum unit.

The avobe-described operation of pool vacuuming unit 50 together with the present invention filter bag continues until the vacuuming cycle is completed or until the debris accumulated within debris chamber 31 reaches a level sufficient to justify cleaning the filter bag.

Figure 3B:
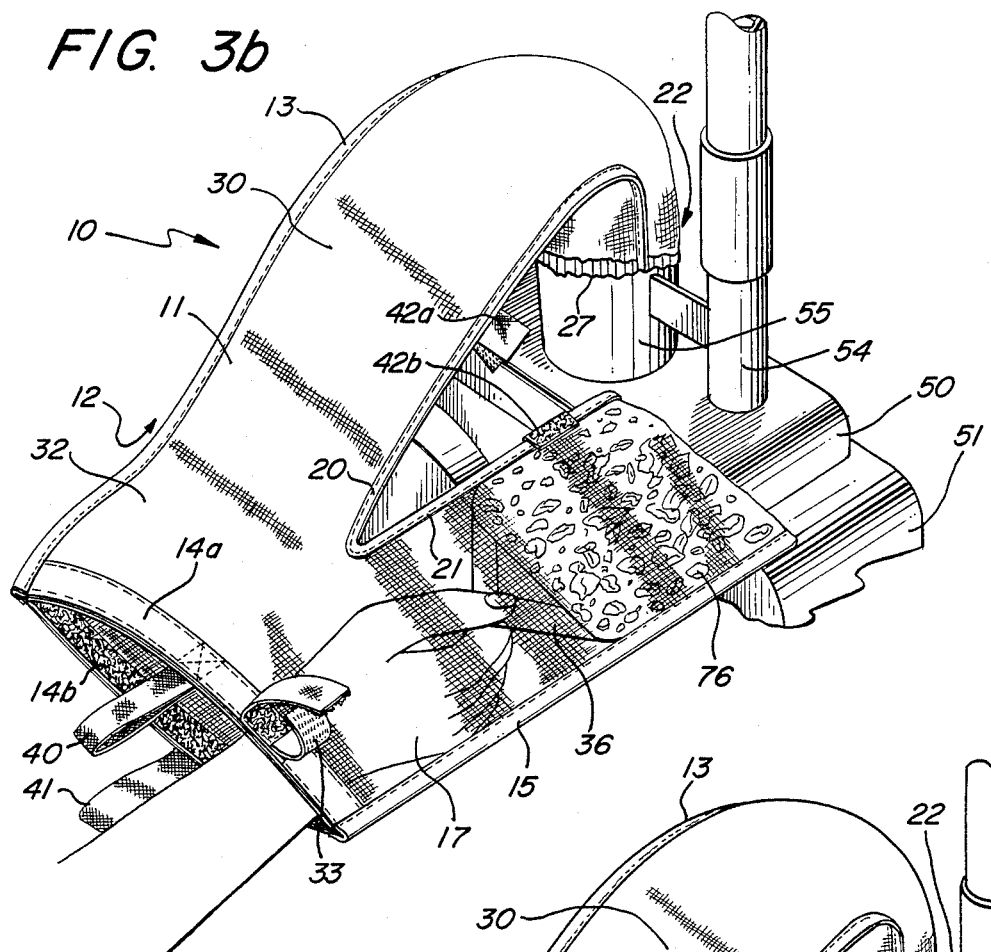
Figure 3C:
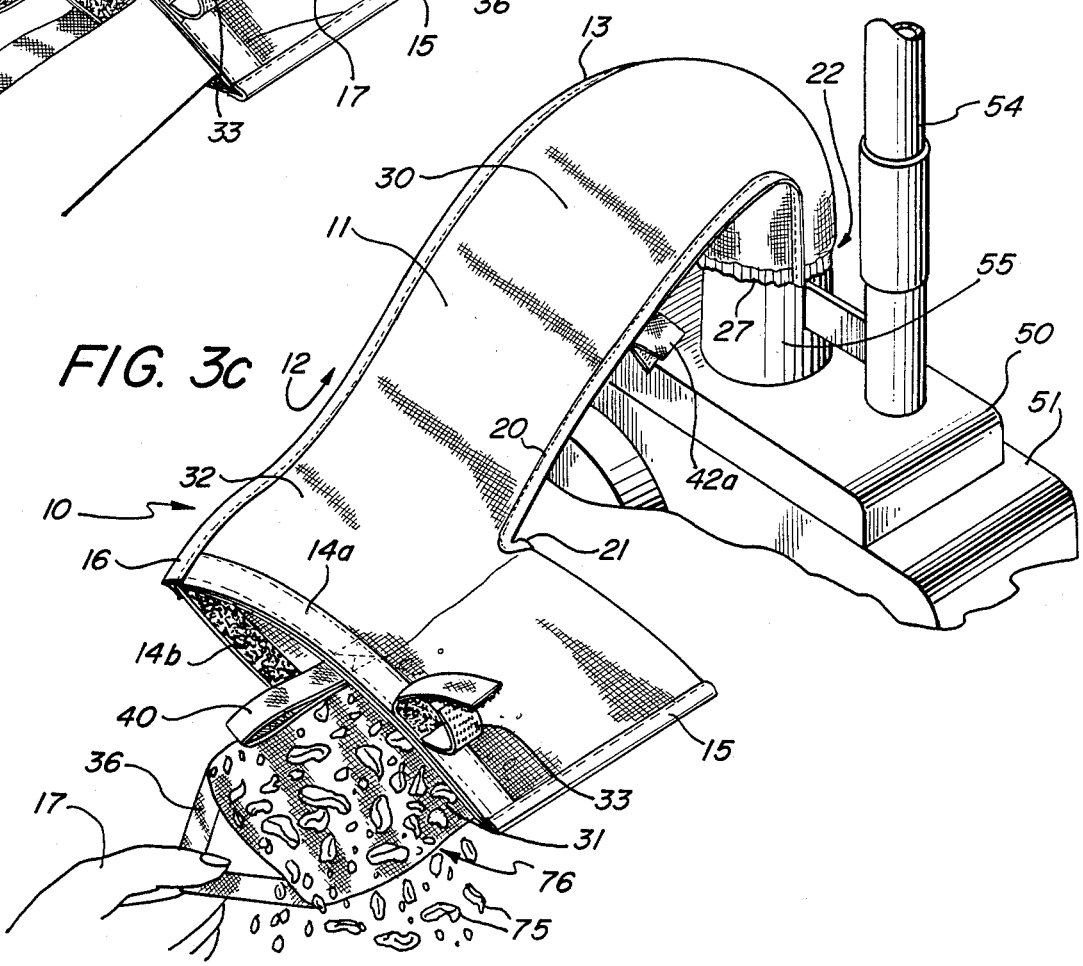

FIGS. 3a, 3b and 3c set forth sequential perspective views of the present invention filter bag during the operation of debris removal. FIG. 3a sets forth the position of filter bag 10 when supply hose attachment 33 has been removed from water supply hose 54. FIG. 3b sets forth the position of filter bag 10 once chamber attachment 42 has been separated and the user begins withdrawing debris chamber 31 inwardly to the cleaning position. FIG. 3c sets forth the further withdrawal of debris chamber 31 in the cleaning position. It should be noted that debris chamber 31 may be turned inside-out without removal of supply hose attachment 33; or while bag 10 is in the vertical position.

Specifically in FIG. 3a, filter bag 10 which as described above comprises a pair of mesh layers 11 and 12 arranged in an overlapping fashion and sewn together by a plurality of seams forming front seam 13, seams 20 and 21, and rear seam 15 together with top seam 14. Curved portion 16 extends from the upper portion of front seam 13 to the forward portion of top seam 14. As described above and as shown better in FIGS. 3b and 3c, top seam 14 is a separable seam comprising a pair of overlapping hook and pile Velcro-type fastening strips secured to layers 11 and 12 by stitching 34. Top seam 14 also supports a pair of loops 40 and 41 secured to mesh layers 11 and 12 respectively and a Velcro-type attachment strip forms supply hose attachment 33. A chamber attachment 42 comprises a Velcro-type attachment strip pair having one member secured to seam 20 and the other secured to seam 21 to facilitate attachment of seams 20 and 21 and separation thereof during the cleaning operation. A loop 36 is secured to seam 21 and is positioned between mesh layers 11 and 12. Front seam 13 and seam 20 form mesh layers 11 and 12 into an elongated flow chamber 30 terminating in a mouth portion 22 which as described above is secured to discharge port 55 (better seen in FIG. 2) of pool vacuum unit 50. Seam 21 and rear seam 15 form mesh layers 11 and 12 into an elongated closed end debris chamber 31 which in the position shown in FIG. 3a is secured to flow chamber 30 by chamber stabilizer attachment 42 and supports an accumulated quantity of debris 36 in accordance with the normal operation of filter bag 10 described above. Pool vacuum unit 50, shown partially in FIG. 3a, comprises a housing 51 having an upwardly extending water supply hose 54 and a discharge port 55 (shown in FIG. 2).

As mentioned above, the position of filter bag 10 shown in FIG. 3a is the position found in the initial cleaning step in which supply hose attachment 33 is released from water supply hose 54. Because of the flexibility of mesh layers 11 and 12, filter bag 10 tends to fall away from water supply hose 54 and assume the curved position shown in FIG. 3a in which mouth portion 22 remains secured to discharge port 55 of pool vacuum 50. It will be recalled, however, that debris chamber 31 may also be emptied in a vertical position.

FIG. 3b sets forth the next step in the cleaning sequence for the present invention filter bag in which Velcro-type attachment 42, which comprises a hook material strip 42a secured to seam 20 and a pile fabric attachment strip 42b secured to seam 21, has been separated to permit debris chamber 31 to move somewhat independently from flow chamber 30. In addition, top seam 14, which comprises a hook material strip 14a and a pile material strip 14b which together form the above-described Velcro-type attachment for top seam 14, have been separated by pulling loops 40 and 41 apart to open top seam 14 and provide user access to upper chamber 32 of filter bag 10. In the position shown in FIG. 3b, user hand 17 has been extended through the now open top seam 14 between hook material strip 14a and pile material strip 14b to extend through upper chamber 32 and into debris chamber 31. In accordance with an important aspect of the present invention, hand 17 reaches to the bottom portion of debris chamber 31 and grasps loop 37. Thereafter, loop 36 is drawn outwardly through the upper portion of debris chamber 31 toward upper chamber 32. This outwardly drawing motion causes the lower portion of debris chamber 31 to be turned inside-out and to carry accumulated debris 36 through the upper portion of debris chamber 31. It should be noted at this point that because the lower portion of debris chamber 31 is turned inwardly, debris accumulation 76 remains captivated between mesh layers 11 and 12 within debris chamber 31. It should also be noted that mouth portion 22 of flow chamber 30 remains securely attached to discharge port 55 of pool vacuum 50 and thus the inconvenience of removal of the entire filter bag and the turning inside-out of the entire bag during the cleaning process is avoided.

FIG. 3c sets forth the position of filter bag 10 near the completion of the cleaning sequence in which mouth portion 22 of flow chamber 30 remains secured to discharge port 55 of pool vacuum unit 50 and in which top seam 14 remains in its open position in which hook strip 14a and pile strip 14b remain separated leaving upper chamber 32 open. With hand 17 having drawn loop 36 outwardly between strips 14a and 14b such that the lower portion of debris chamber 30 having been turned completely outside-in extends beyond top seam 14, debris accumulation 76 is no longer completely captivated between mesh layers 11 and 12. Thus, the bottom portion of debris chamber 31 as well as loop 36 extends beyond seam 14.

In the event a relatively small amount of debris accumulation 76 is present in debris chamber 31, the cleaning sequence may be complete in the position shown in FIG. 3c as loops 36 and 37 are shaken by user hands 17 to dislodge any clinging portions of debris accumulation 76. In the event, however, a more substantial quantity of debris has accumulated within debris chamber 31, the cleaning cycle may be enhanced by folding upper chamber 32 to an inside-out configuration by turning upper chamber 32 inside-out and passing strips 14a and 14b across mesh layers 11 and 12 respectively such that debris chamber 31 and upper chamber 32 are completely reversed permitting the inside surfaces of mesh layers 11 and 12 to be freed of debris by shaking loop 36 or otherwise cleansed of accumulated debris.

Once the accumulated debris has been removed from the interior surfaces of mesh layers 11 and 12 by the foregoing cleaning process, the present invention filter bag is returned to its service position shown in FIGS. 1 and 2 by simply reversing the above-described process. Specifically, upper chamber 32 is returned to its normal position by drawing strips 14a and 14b outwardly causing chamber 32 to be returned to the position shown in FIG. 3c. Thereafter, hand 17 again grasps loops 36 and 37 and forces debris chamber 31 through upper chamber 32 to the position shown in FIG. 3b. Thereafter, hand 17 still grasping loops 36 and 37, extends through debris chamber 31 returning the bottom portion of debris chamber 31 to the position shown in FIG. 3a. Once the filter bag has returned to the position shown in FIG. 3a, user hand 17 is withdrawn from the interior of the filter bag and hook strip 14a and 14b are again joined together and filter bag 10 is raised to the position shown in FIG. 1 after which supply hose attachment 33 is secured to water supply hose 54 completing the cleaning cycle.

It should be noted that in accordance with an important aspect of the present invention, the pool vacuum filter bag is taken through its complete cleaning cycle without the need of removing the filter bag from the pool vacuum unit. This, of course, saves considerable time in the pool filter bag cleaning process. In addition, it should be noted that the easy manner in which the separated debris chamber may be drawn outside-in to remove accumulated debris and the manner in which upper chamber 32 may be turned inside-out to further enhance the cleaning process, renders virtually the entire interior of the present invention filter bag exposed for easy removal of debris. In contrast to prior art bags which provide some sort of aperture through which accumulated debris must be drawn by the user's hand, the present invention pool filter bag may be simply and quickly configured inside-out to a position in which debries is simply shaken loose from the bag and need not ne handled extensively by the user.

It will be apparent to those skilled in the art that the curved flow of the present invention filter bag provided by the cooperation of curved portion 16 (see in FIG. 2) may be provided by any number of interior baffle structures or seam configurations. FIGS. 4a and 4b set forth examples of such variations. FIG. 4a sets forth a partial view of filter bag 10 showing the upper corner of front seam 13 and top seam 14. In the alternate embodiment shown in FIG. 4a, front seam 13 extends upwardly and joins top seam 14 without the use of curved portion 16 as shown in the preferred embodiment set forth in FIG. 2. A curved baffle 80 is used in the embodiment set forth in FIG. 4a to provide the fluid flow directing function of curved portion 16 in the preferred embodiment. Baffle 80 further includes a pair of outwardly extending tabs 81 and 82 which are secured within top seam 14 and front seam 13 respectively to position baffle 80 in the upper front corner of filter bag 10 such that the curved surface of baffle 80 may function in much the same manner as curved portion 16 in the embodiment shown in FIGS. 1 through 3.

FIG. 4b sets forth still another embodiment of the present invention in which front seam 13 and top seam 14 are formed in much the same manner as that shown in the embodiment of FIG. 4a. In addition, a curved seam 83 is added to the embodiment of FIG. 4b to provide still another method of imparting the curved directed flow of the present invention filter bag. Thus, curved portion 83 provides the flow directing properties provided by curved portion 16 in the above-described preferred embodiment.

It will be apparent, therefore, to those skilled in the art that any number of structures may be utilized to provide the advantages of curved directed flow found in the present invention.

While particular embodiments of the invention have been shown and described, it will be obvious to those skilled in the art that changes and modifications may be made without departing form the invention in its broader aspects. Therefore the aim in the appended claims is to cover all such changes and modifications as fall within the true spirit and scope of the invention.

That which is claimed is:

1. For use in filtering the discharge flow of a submersible pool vacuum having a vacuum unit for drawing pool water and debris from the submerged pool surfaces, a discharge port for discharging a flow of pool water and vacuumed debris, and a water supply hose; a pool vacuum filter bag comprising:

an upper chamber formed of a mesh material and defining a separable top seam and closed side seams;

an enlogated flow chamber formed of a mesh material and having a first opening coupled to said upper chamber, a mouth portion coupleable to said discharge port, and an elongated flow passage therebetween, said flow chamber operative to receive said flow of pool water and debris and couple it to said upper chamber;

an elongated closed-end debris chamber formed of a mesh material separable from said flow chamber and coupled to said upper chamber and extending downwardly therefrom;

chamber attachment means for releaseably attaching said debris chamber to said flow chamber; and flow directing means within said upper chamber for directing said flow of pool water and debris laterally within said upper chamber, said debris chamber being constructed to be turned inside-out and to be drawn outwardly through said separable top seam of said upper chamber when separated while said mouth portion remains coupled to said discharge port.

2. A pool vacuum filter bag as set forth in claim 1 wherein said upper chamber, debris chamber, and flow chamber are formed of a pair of substantially identical layers of mesh material arranged in overlapping fashion and joined by seams to form said filter bag.

3. A pool vacuum filter bag as set forth in claim 2 wherein said seams joining said layers of mesh material are formed by sewn stitches.

4. A pool vacuum filter bag as set forth in claim 3 wherein said filter bag defines a front seam extending from said mouth portion to said top seam of said upper chamber forming an upper front corner of said upper chamber and wherein said flow directing means includes an inwardly curved seam portion of said front seam at said upper front corner.

5. A pool vacuum filter bag as set forth in claim 3 wherein said filter bag defines a front seam extending from said mouth portion to said top seam of said upper chamber forming an upper front corner of said upper chamber and wherein said flow directing means includes a flow baffle supported within said upper front corner and having an inwardly curved baffle surface.

6. A pool vacuum filter bag as set forth in claim 3 wherein said filter bag defines a front seam extending from said mouth portion to said top seam of said upper chamber forming an upper front corner of said upper chamber and wherein said flow directing means includes an additional seam joined to said front seam and said top seam proximate said upper front corner and curving inwardly across said upper front corner.

7. A pool vacuum filter as set forth in claim 4 further including water supply hose attachment means for attaching said top seam to said water supply hose.

8. A pool vacuum filter as set forth in claim 7 wherein said water supply attachment means include a hook and pile fabric fastener.

9. A pool vacuum filter as set forth in claim 8 wherein said top seam includes a strip of hook fabric sewn to one of said layers of mesh material and a strip of pile fabric sewn to the other of said layers of mesh material.

10. A pool vacuum filter bag as set forth in claim 9 further including a pair of loop members each sewn to one of said layers of mesh material for use in separating said top seam.

11. A pool vacuum filter bag as set forth in claim 3 further including a loop member supported within said debris chamber at said closed end thereof.

12. A pool vacuum filter bag as set forth in claim 11 wherein said chamber attachment means include a V-shaped strip of hook fabric and a strip of pile fabric.

13. For use in filtering the discharge flow of a submersible pool vacuum having a vacuum unit for drawing pool water and debris from the pool submerged surfaces, a discharge port for discharging a flow of pool water and vacuumed debris, and a water supply hose; a pool vacuum filter bag comprising:

first and second layers of mesh material having substantially identical shapes and arranged in an overlying relationship each defining a flow chamber portion, a closed-end debris chamber portion and an upper chamber portion, said flow chamber portions, closed-end debris chamber portions and upper chamber portions each defining respective front and rear edges and said upper chamber portion defining top edges;

a first seam joining front edges of said flow chamber portions and said upper chamber portions of said first and second layers;

a second seam joining said rear edges of said upper chamber portions, said front and rear edges of said closed-end debris chamber portions and said rear edges of said flow chamber portions of said first and second layers;

a separable third seam joining said top edges of said upper chamber portions of said first and second layers, said first seam and said third seam forming an upper front corner of said upper chamber and said first seam defining an inwardly curved portion at said upper front corner, said debris chamber being constructed to be turned inside-out and to be drawn outwardly through said separable third seam when separated while said flow chamber remains coupled to said discharge port.

14. A pool vacuum filter bag as set forth in claim 13 wherein said separable third seam is formed of a strip of hook fabric fastened to said first layer and a strip of pile fabric sewn to said second layer.

15. A pool vacuum filter bag as set forth in claim 14 wherein said third seam includes first and second loops attached to said first and second layers respectively.

16. A pool vacuum filter bag as set forth in claim 15 wherein said debris chamber defines corner portions and further including a loop supported within said debris chamber at said corner portions by said second seam.

17. For use in filtering the discharge flow of a submersible pool vacuum having a vacuum unit for drawing pool water and debris from the pool submerged surfaces, a discharge port for discharging a flow of pool water and vacuumed debris, and a water supply hose; a pool vacuum filter bag comprising:

first and second layers of mesh material having substantially identical shapes and arranged in an overlying relationship each defining a flow chamber portion, a closed-end debris chamber portion and an upper chamber portion, said flow chamber portions, closed-end debris chamber portions and upper chamber portions each defining respective front and rear edges and said upper chamber portion defining top edges;

a first seam joining said front edges of said flow chamber portions and said upper chamber portion of said first and second layers;

a separable second seam joining said rear edges of said upper chamber portions, a closed second seam joining said front and rear edges of said closed-end debris chamber portions and said rear edges of said flow chamber portions of said first and second layers, said separable second seam formed of a hook and loop fabric attachment which tends to collect and retain debris passing over it;

a third seam joining said top edges of said upper chamber portions of said first and second layers, said first seam and said third seam forming an upper front corner of said upper chamber and said first seam defining an inwardly curved portion at said upper front corner to create a lateral flow of water across a portion of said hook and loop fabric attachmnet to sweep debris from said separable top seam;

said debris chamber being constructed to be turned inside-out and to be drawn outwardly through said separable second seam of said upper chamber when separated while said flow chamber remains coupled to said discharge port.

* * * * *